United States Patent [19]

Twardowski

[11] Patent Number: 4,535,333

[45] Date of Patent: Aug. 13, 1985

[54] TRANSMITTER AND RECEIVER FOR CONTROLLING REMOTE ELEMENTS

[75] Inventor: Joseph W. Twardowski, Schaumburg, Ill.

[73] Assignee: Chamberlain Manufacturing Corporation, Elmhurst, Ill.

[21] Appl. No.: 422,452

[22] Filed: Sep. 23, 1982

[51] Int. Cl.³ .......................... H04B 9/00; H04Q 9/00

[52] U.S. Cl. .......................... 340/825.69; 340/825.22; 340/825.31; 340/825.72; 455/151

[58] Field of Search ...................... 340/825.69, 825.22, 340/825.31, 696, 825.72; 455/151

[56] References Cited

U.S. PATENT DOCUMENTS

| | | | |
|---|---|---|---|
| 4,263,536 | 4/1981 | Lee et al. | 318/266 |
| 4,291,411 | 9/1981 | Muller et al. | 455/151 |
| 4,328,540 | 5/1982 | Matsuoka et al. | 364/167 |

FOREIGN PATENT DOCUMENTS

| | | | |
|---|---|---|---|
| 1423126 | 1/1976 | United Kingdom | 340/825.72 |

*Primary Examiner*—Donald J. Yusko

[57] ABSTRACT

Transmitters and receivers for controlling remote elements which use a synchronous serial transmission format and which allows changes in coding to be automatically made between the receiver and transmitter and wherein the code is stored in memories of the transmitter and receiver and wherein the receiver can generate and transmit a new code with a light emitting diode so as to change the code in the transmitter. The transmitter and the receiver use micro-computers which are suitably programmed and include non-volatile memories.

12 Claims, 12 Drawing Figures

NOTE 1. Pulse width of sync pulse determines sampling time interval starting from the leading edge of each pulse.

TRANSMITTER AND RECEIVER FOR CONTROLLING REMOTE ELEMENTS

CROSS-REFERENCE TO RELATED APPLICATIONS

This application is related to co-pending application of Joseph W. Twardowski and F. J. Liotine entitled "Method and Apparatus For Controlling the Coding In A Transmitter and Receiver".

BACKGROUND OF THE INVENTION

1. Field of the Invention

This invention relates in general to control transmitters and receivers and in particular to a novel control system.

2. Description of the Prior Art

Remote control transmitters and receivers are known as, for example, for garage door openers and other devices. Initially, a different carrier frequency was utilized for each pair of transmitters and receivers so as to isolate them from other units. Also, various coding schemes have been utilized to encode data into binary form. Certain of such transmitters and receivers include a plurality of two position switches which control the coding for the transmitter and receiver and in such systems the codes can be changed by manually changing the positions of the switches to different positions to assure that the position of the switches in the transmitter and receiver are the same.

SUMMARY OF THE INVENTION

The present invention comprises a novel multi-channel transmitter and receiver for controlling a plurality of functions and includes the feature of changing the code in the receiver and transmitter to one of a large number of codes in an automatic manner. A pulse length binary code is utilized.

When it is desired to change the identification code, a program mode switch is closed in the receiver and the micro-computer recalls from the non-volatile memory the last stored code. Using this code as a start, it performs a random number generation algorithm and stores the newly generated code in the non-volatile memory and immediately transmits the new code through a light emitting diode. The transmission format with the light emitting diode at the receiver continues until the program mode switch is turned off. During the energization of the light emitting diode in the receiver, the transmitter is placed in close proximity to the receiver so that it detects the code from the light emitting diode and the new code is then stored in the memory of the transmitter which then produces a flashing ready signal to indicate to the operator that the programming cycle has been completed.

It is seen that the present invention provides an improved remote control system that can be used for a number of channels and allows for automatic change of the address coding between the transmitter and receiver.

Another object of the invention is to provide transmitters and receivers which have a large number of possible codes so as to eliminate interference between closely spaced transmitters and receiver systems.

Yet another object of the invention is to provide an improved transmitter and receiver system for a remote control device.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
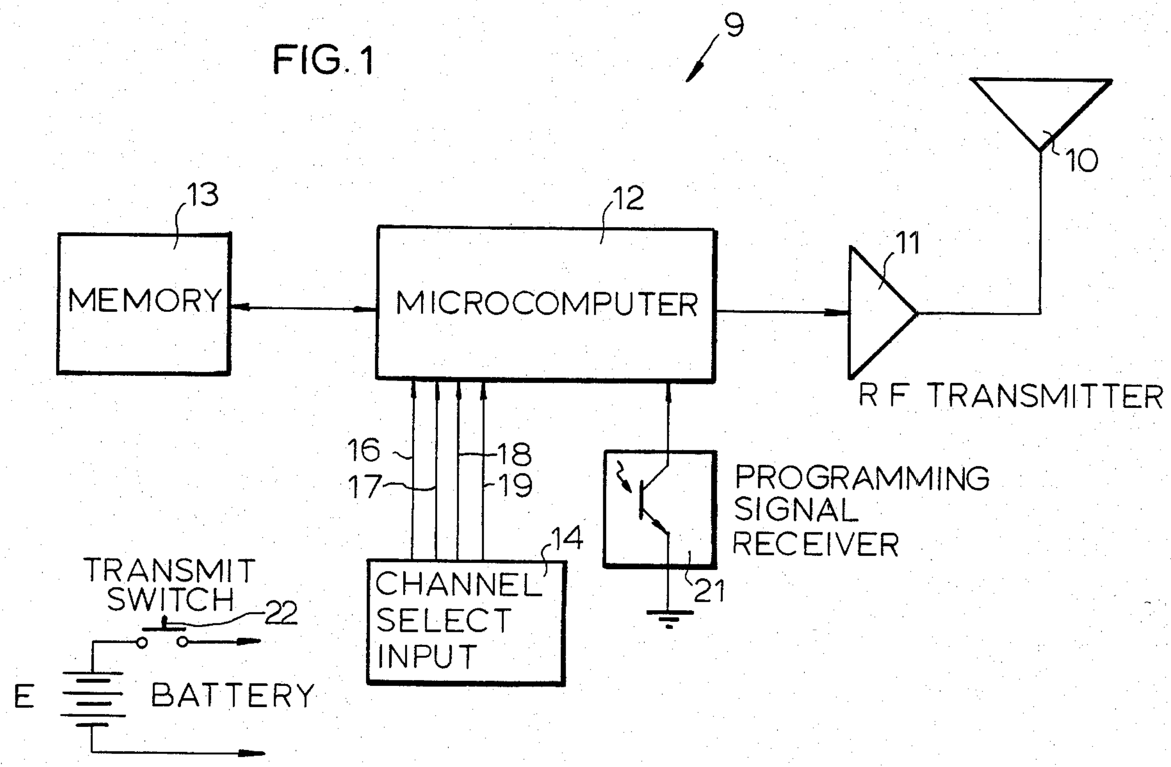
FIG. 1 comprises a block diagram of the transmitter.

FIG. 1 illustrates in block form the transmitter of the invention which comprises an antenna 10, an RF transmitter section 11 connected to the antenna and a micro-computer 12 supplying an input signal to the RF transmitter 11. The micro-computer is connected to a memory 13 which may be a non-volatile type memory and a number of channel select inputs 16, 17, 18 and 19 are connected to a channel selector unit 14 and supply inputs to the micro-computer 12. A power supply comprises a battery E and a transmit switch 22 such that when the transmit switch 22 is closed the transmitter is energized by applying power to the various units of the transmitter. A programming signal receiver 21 is connected to the micro-computer and provides means for selecting the code in the transmitter.

Figure 2:
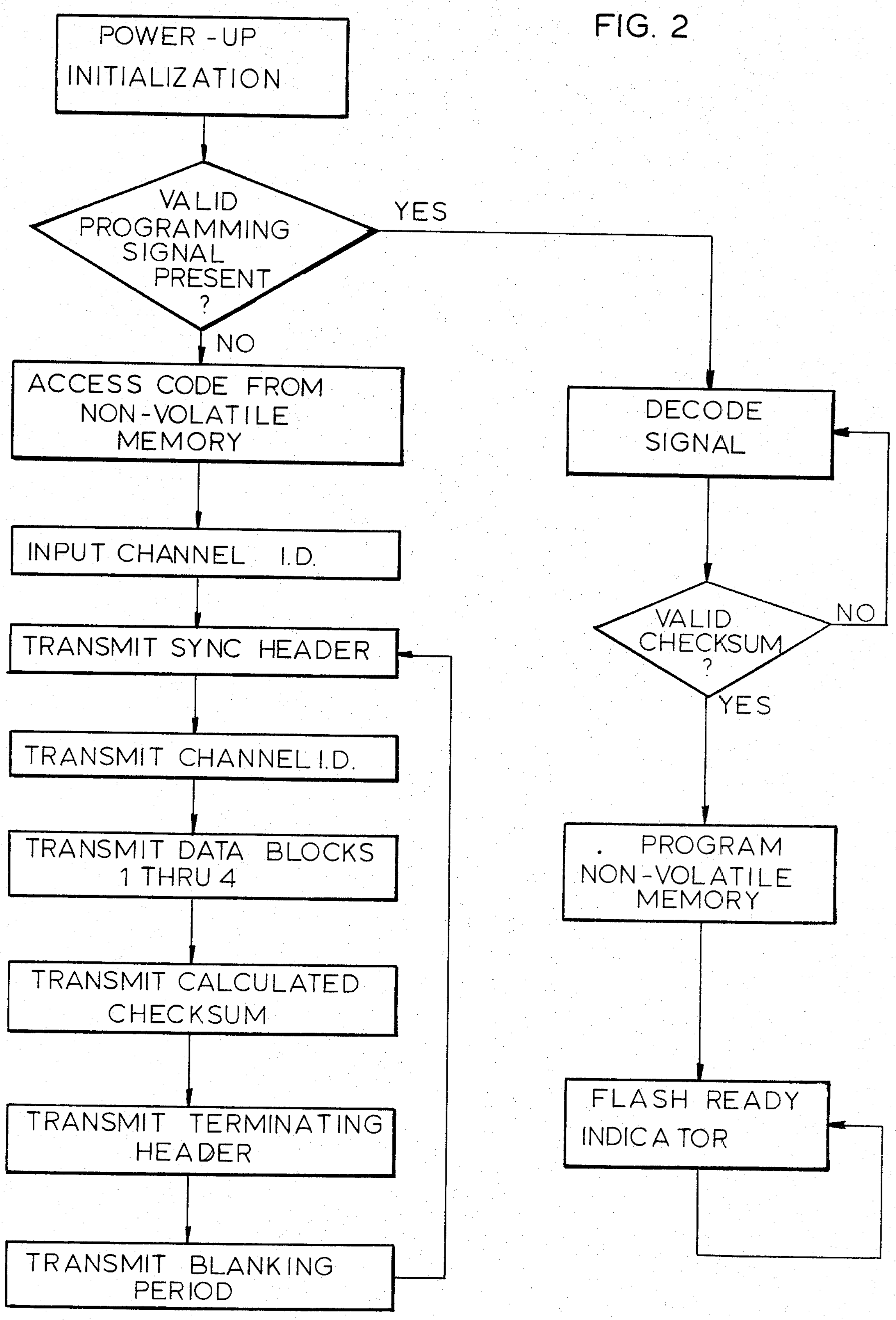
FIG. 2 comprises a flow chart for the transmitter.

FIG. 2 comprises the transmitter flow chart and when power is turned on the micro-computer 12 determines whether a valid programming signal is present.

Figure 3:
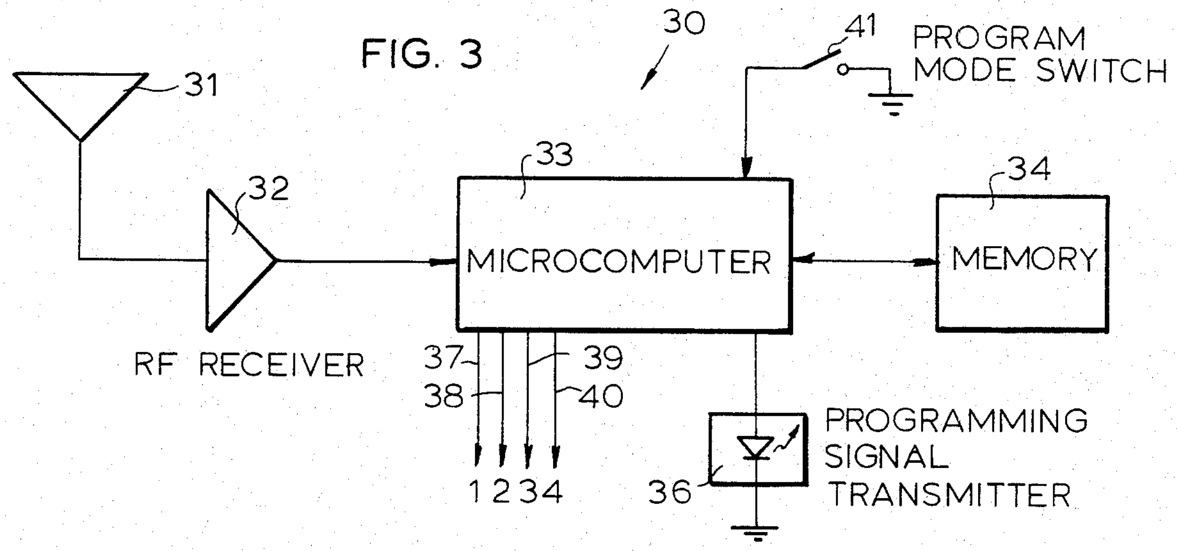
FIG. 3 comprises a block diagram for the receiver.

FIG. 3 is a block diagram of the receiver 30 which comprises an antenna 31 for receiving radiation from the transmitter 9. The receiver 30 includes an RF section 32 which is connected to the output of the antenna 31 and the RF receiver section 32 supplies an input to a micro-computer 33. A memory 34 such as a non-volatile type is connected to the micro-computer 33. A program mode switch 41 is connected to the micro-computer and output channel leads 37, 38, 39 and 40 supply operating signals for various apparatus or functions which are to be controlled as, for example, channel 1 might comprise a garage door opener. Channel 2 might comprise a security control channel. A programming signal transmitter 36 is connected to the micro-computer 33 for programming the transmitter 9.

Figure 4:
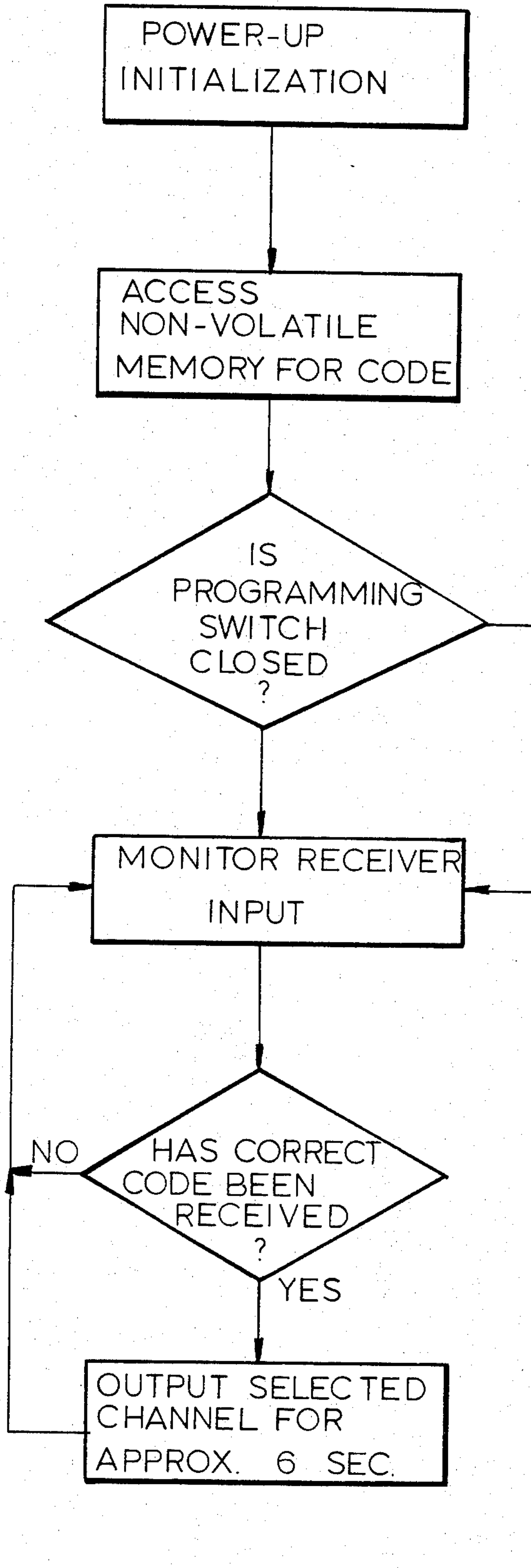
FIG. 4 comprises a flow chart for the receiver.
Figure 4:
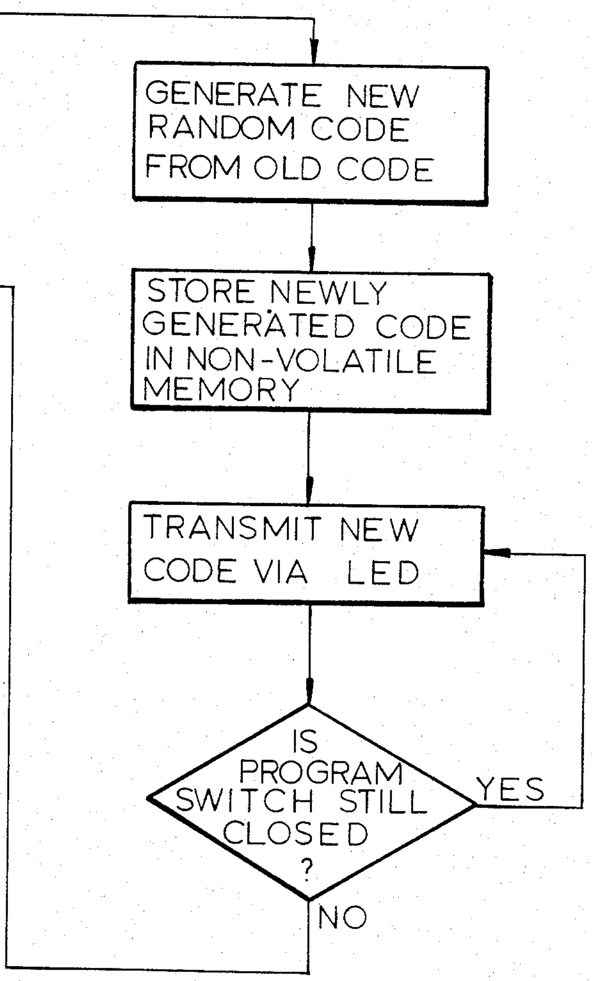

FIG. 4 comprises a flow chart for the receiver.

The transmitter and receiver of the invention eliminate the dip switches for code selection which are required in prior art devices and allows the expansion of channels so that a number of channels can be utilized to control different functions. Faster response times are obtained than prior art control transmitters and receivers. A specific embodiment of the invention was constructed wherein a four-bit single chip micro-computer was utilized rather than custom discrete logic integrated circuit for performing the encoding and decoding of the algorithm. In addition, a non-volatile memory is used rather than a multiple three position switch for storing the custom code for each transmitter and receiver system.

The use of a single chip micro-computer rather than a discrete logic integrated circuit allows system flexibility for additional expansion and for various other radio controlled applications in addition to garage door opener systems without the requirement of major and exhaustive redesign efforts or custom integrated circuits. For such subsequent changes, a simple micro-program change in the self-contained mask ROM is all that is required and thus only software changes are necessary.

By using non-volatile memories rather than the dip switches used in the transmitters and receivers of the prior art devices requires that the randomly selected code be supplied from the receiver to the transmitter. Because of Federal Communication Commission rules and regulations, the transmission of radio frequency signals for this purpose cannot be used since the transmission of a coding signal for defining the code in the transmitter would not be within the Rules for actuating a garage door opener. This would comprise the transmission of a message containing information. This means that (1) during the programming mode transfer of code information from the receiver to the transmitter, the transmitter and receiver would have to be hard wired together or (2) the transfer of such data occurs by using infrared transmitters and receivers. The use of infrared transmitting and receiving means requires no physical contact between the systems.

In the present invention a synchronous serial transmission data format is utilized because (1) the equivalent replacement of the prior art nine pole three-position switch with a non-volatile memory requires that the electrical inputs be binary and (2) the present design allows additional channel expansion and identification.

In a particular embodiment constructed according to the invention, the maximum number of channels was selected to be sixteen and allow $2^{16}$ possible code combinations or 65,536.

Figure 6A:
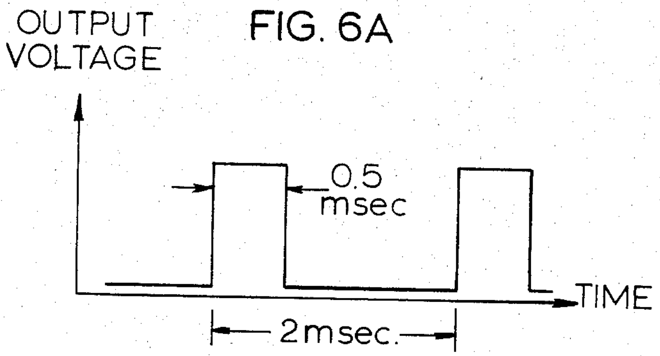
FIG. 6A illustrates a sync header waveform.
Figure 6B:
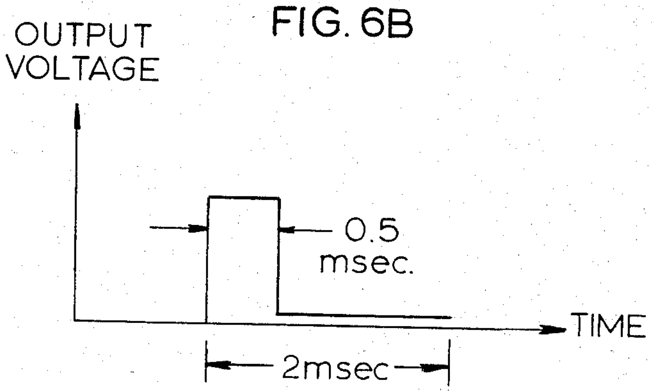
FIG. 6B illustrates a terminating header waveform.
Figure 5:
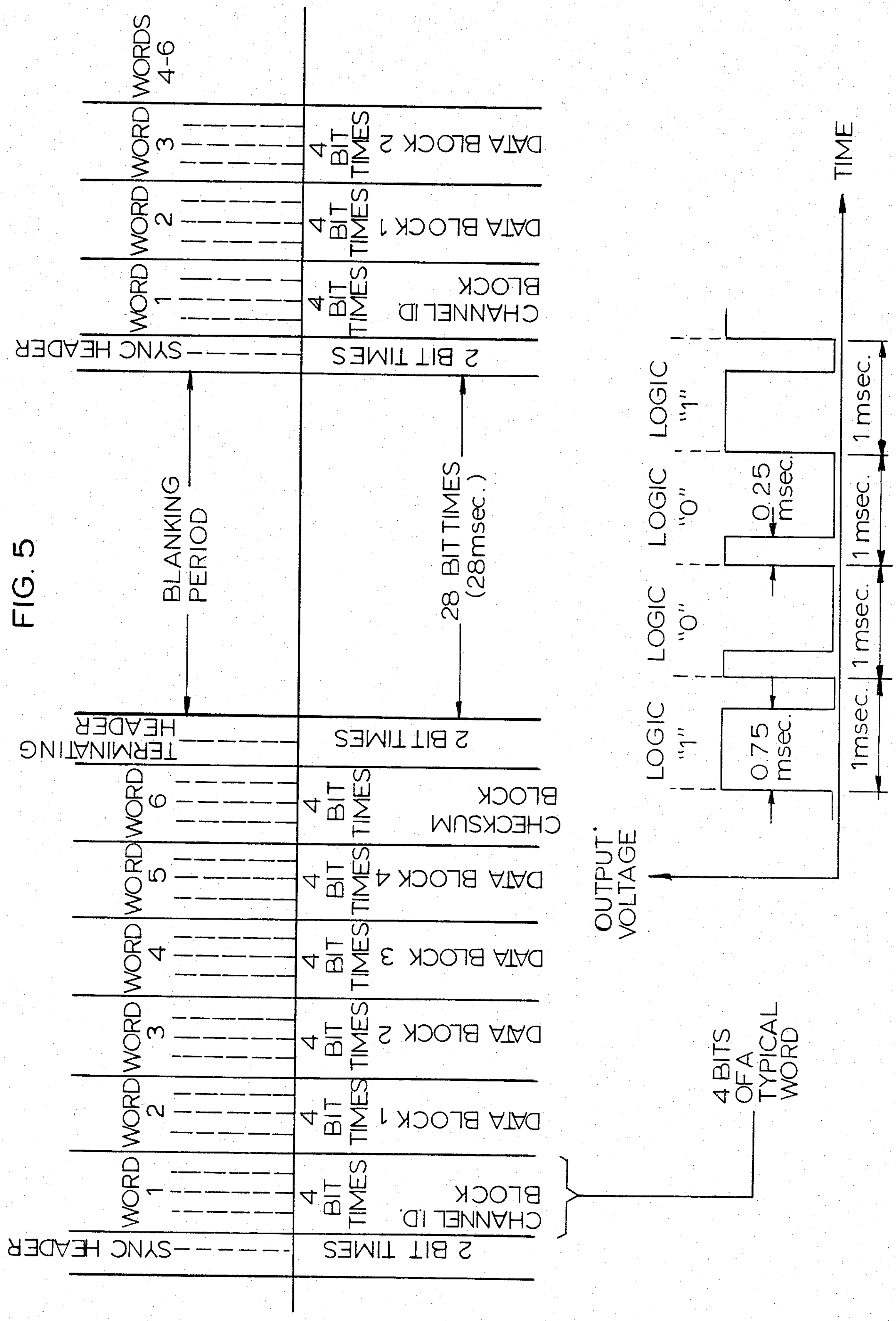
FIG. 5 illustrates a transmission signal format.

The transmission format used in the invention utilizes security and privacy and is binary and uses pulse position modulation as the decoding format for data transmission. FIGS. 5 and 6A and 6B illustrate the data format used. As shown in FIG. 5, a synchronization header frame of two bits is used for synchronization at the receiver. The first word 1 is a channel identification block of four-bits in length which contains the binary coded information that identifies the transmitting channel and this selection limits the maximum number of channels to sixteen.

Words 2 through 5 are data blocks and comprise four words each of four-bits containing binary coded information that can represent the code for a particular channel ($2^{16}$ possible code combinations or 65,536). Alternatively, other forms of digital information as, for example, the output of a transducer can be included in these words.

Word 6 is a checksum block and is an error checking format which is derived by the binary addition of the identification block with data blocks 1 through 4 and eliminates any carry bits. For example:

| BLOCK | MSB Bit 4 | Bit 3 | Bit 2 | LSB Bit 1 |
|---|---|---|---|---|
| Channel Identification Block | 0 | 1 | 1 | 0 |
| Data Block 1 | 1 | 1 | 0 | 1 |
| Data Block 2 | 1 | 0 | 0 | 1 |
| Data Block 3 | 1 | 1 | 1 | 0 |
| Data Block 4 | 1 | 1 | 0 | 1 |
| Checksum Block = binary sum of all blocks less any carry bits | 0 | 1 | 1 | 1 |

Then a termination header which is two-bits in length indicates to the receiver that the current information transmission train has terminated. Then there is a blanking period of 28 bits which in a specific embodiment comprises 28 msec and then the data format is repeated again.

An example of word 1 is shown in exploded form in FIG. 5 comprising four-bits of a typical word and a logic 1 comprises a pulse of 0.75 msec and a 0.25 period of no signal. A logic 0 comprises a signal of 0.25 and then no signal for 0.75 msec.

FIG. 3 illustrates the receiver block diagram and the software flow chart for the receiver is illustrated in FIG. 4. When the power is turned on, the receiver software first turns on the complete hardware system. It first interrogates the program mode switch input. If the program mode switch 41 is closed, the micro-computer 33 proceeds to access the non-volatile memory 34 to recall the last stored code. Using this code as a start, it then performs a random number generation algorithm and stores the newly generated code in the non-volatile memory and immediately transmits this new code through the light emitting diode 36. The transmitter 9 is placed in close proximity to the receiver 30 such that the programming signal receiver 21 receives the information from the light emitting diode 36. The transmission signal format of the receiver is as shown in FIG. 5 except that it does not need the channel identification block and uses a shorter blanking time equal to 5 msec. The receiver continues to transmit the code until the program mode switch 41 is opened after which the receiver monitors the receiver input port from the RF section and antenna.

Figure 9:
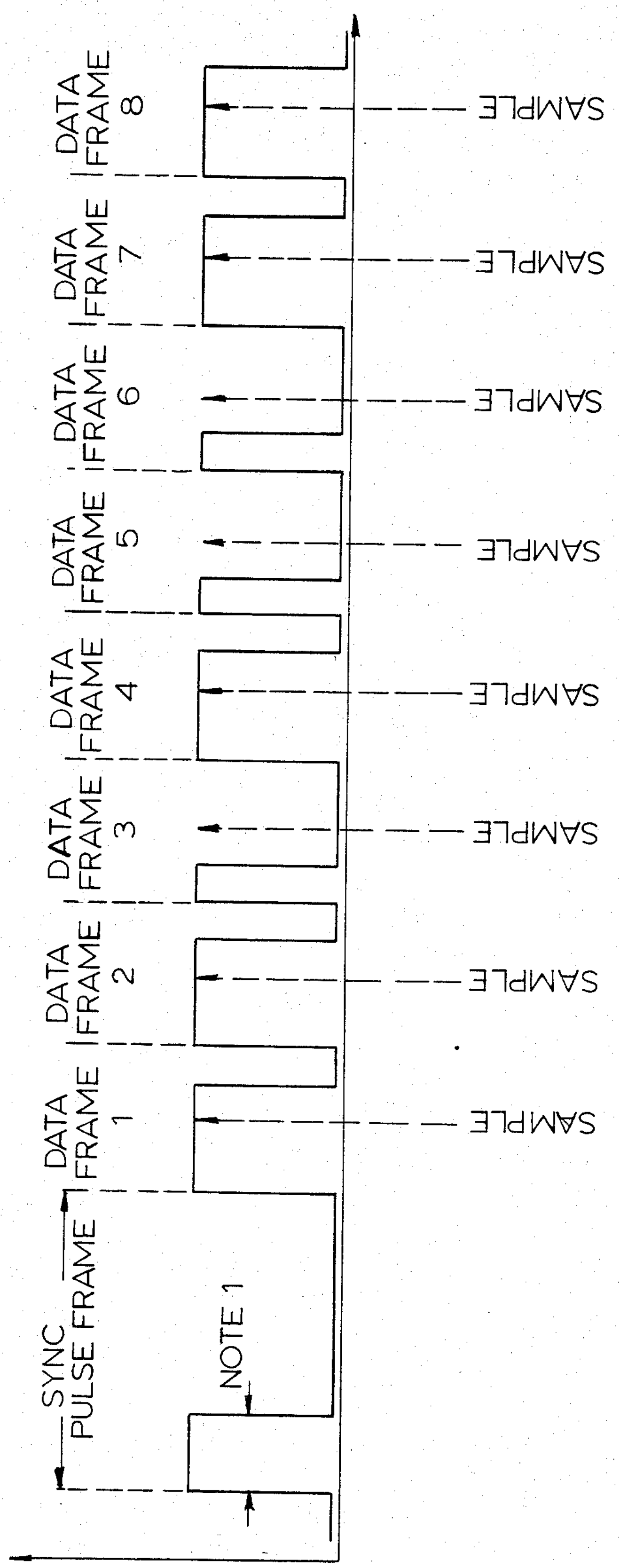
FIG. 9 illustrates a typical pulse train.

The receiver algorithm contains a software phase lock loop to lock it on the receiver sync header. All timing information required to perform the remainder of the algorithm is contained in the pulse width of the sync pulse. A software timing loop times out the pulse and stores this value in the memory. For each consecutive negative to positive transition, the micro-computer samples the input at the time interval it calculated from the sync pulse, as illustrated in FIG. 9. After all of the bits are sampled and stored in the memory, a comparison is made with the code stored in the non-volatile memory for a valid match. If a match is found, the appropriate channel output is identified by an appropriate light emitting diode to identify that particular channel.

FIG. 1 comprises a block diagram of the transmitter and FIG. 2 illustrates the software flow chart of the transmitter. The transmitter upon power up interrogates the input photo-transistor 21 for a period of about 10 msec for indication of a valid programming signal. If no programming signal is available within the first ten milliseconds, the transmitter software assumes that the presently stored code is accurate and the transmitter proceeds to transmit such code. It accesses the stored code from the non-volatile memory, reads the channel identification number, computes the checksum and then transmits all the information using the format illustrated and described.

If a programming signal is received, the transmitter decodes the incoming information and if the checksum is correct stores the new code in its non-volatile memory 13 and outputs a flashing ready signal to indicate that the programming cycle has been completed.

All output transmission timing is based on an ideal instruction execution time of 20 msec. Since the software is fixed, the only parameters that affect output timing are the resistor capacitor tolerances and any input tolerance variations between different micro-computers.

A software pseudorandom number generator is utilized at the receiver to generate the different codes.

The use of software to generate random values results in a paradox. The fact that an algorithm exists for a process implies that the process outputs are not truly random because the algorithm can be used to predict the output sequence. True random values can only be generated by the use of systems such as "memory garbage" or "human reaction time". The use of human reaction time requires additional hardware and expense which is undesirable in the high volume electronic industry. In the present invention, the use of "memory garbage" to start the system "initiation" or starting value is used on a one time basis.

In the algorithm used every time a random number is required a new sixteen bit configuration will result from the seed or initiation value used. Continuous recall for sufficient number of times will result in all the possible sixteen bit configurations. However, the outputs will appear random if the sequence of outputs are considered and it is impossible to prove that the program is not producing true random numbers. The distribution of outputs is uniform over the range of possible outputs although all possible sixteen bit values appear before any repetition occurs. In the present invention 65,536 outputs will occur before any repetition occurs.

The algorithm used works as follows. The random code is stored in four blocks of memory each four-bits wide for a sixteen bit word. This allows a binary representation of 65,536 discrete numbers. However, for the random number generator algorithm to work, the all zero state must not be used therefore there are only 65,535 numbers that can be used.

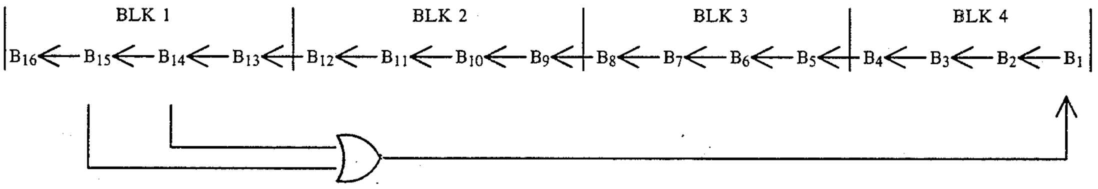

Whenever the program calls for random number, the previous value or "seed" is recalled. Each bit is shifted left one position. Bits 14 and 15 are exclusive or-ed and the result is shifted into the first position of block 4. In this manner, all possible 65,535 combinations will result before the pattern repeats.

The program for the transmitter micro-processor 12 and the program for the receiver micro-processor 33 are attached.

Figure 7A:
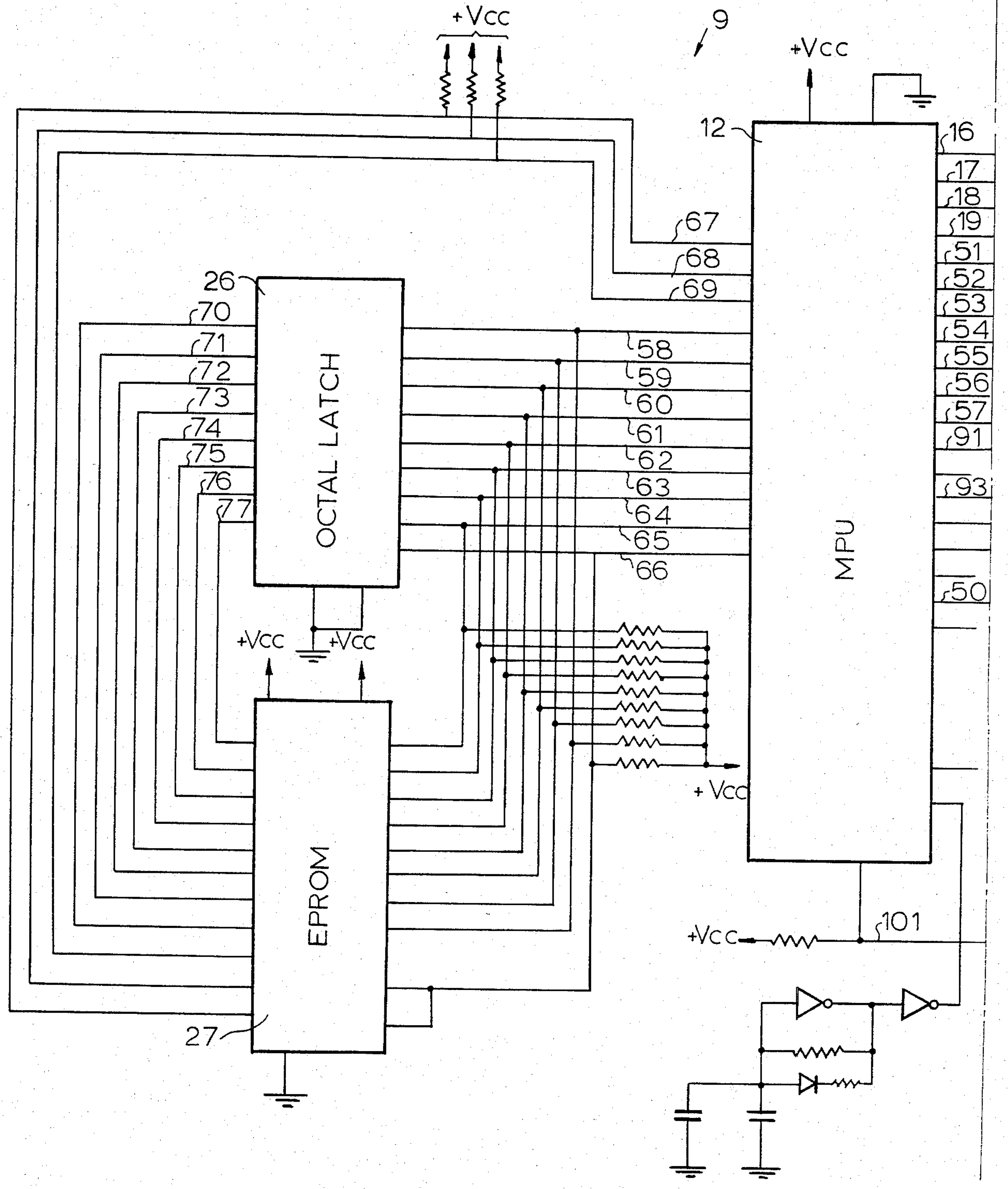
FIGS. 7A and 7B comprise a schematic diagram of the transmitter.
Figure 7B:
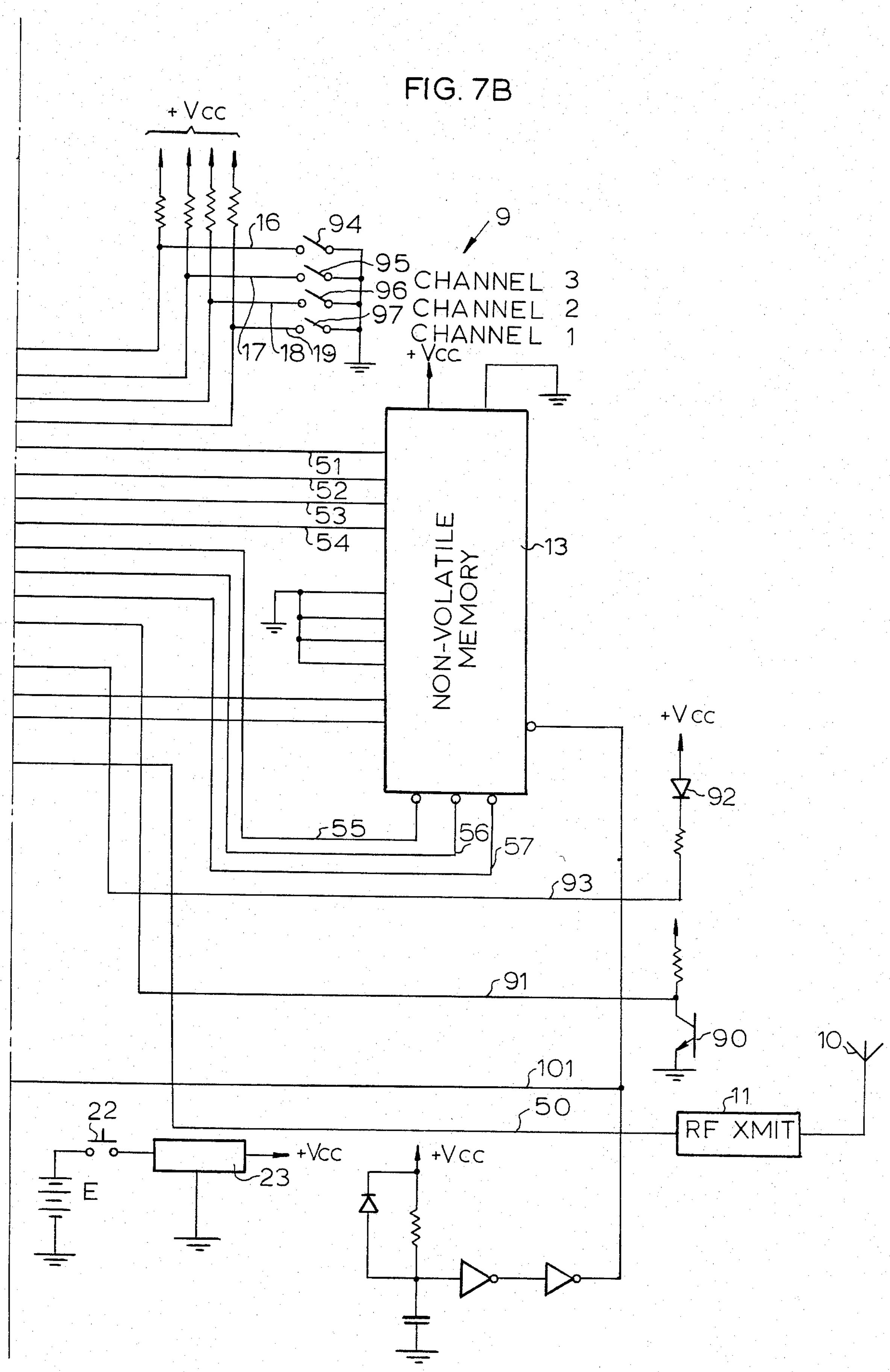

FIGS. 7A and 7B illustrate the electrical schematic of the transmitter 9, the antenna 10 is connected to the RF transmitter 11 which receives an output on lead 50 from output terminal SO of the micro-computer 12. The micro-computer 12 may be a National type 404LP, for example. The non-volatile memory 13 may be a XICOR type X-2210 and is connected by leads 51 through 57 to the micro-processor 12 as illustrated. An octal latch 26 is connected to the micro-computer 12 by leads 58 through 66 and might be a type 74C373. A EPROM 27 might be a type 2716 available from INTEL and is connected by leads 58 through 69 to the micro-computer 12 and is further connected to the octal latch 26 by leads 70 through 77. The power supply E and transmit switch 22 are connected to a regulator 23 which produces the drive voltage +Vcc. Infrared sensor 90 is connected by lead 91 to the micro-computer 12. A ready indicator 92 is connected by lead 93 to the micro-computer 12. Channel selector switches 94 through 97 are connected to channel selector leads 16, 17, 18 and 19 which are connected to the micro-computer 12. A lead 101 is connected from the memory 13 to the reset terminal of the micro-computer 12.

Figure 8A:
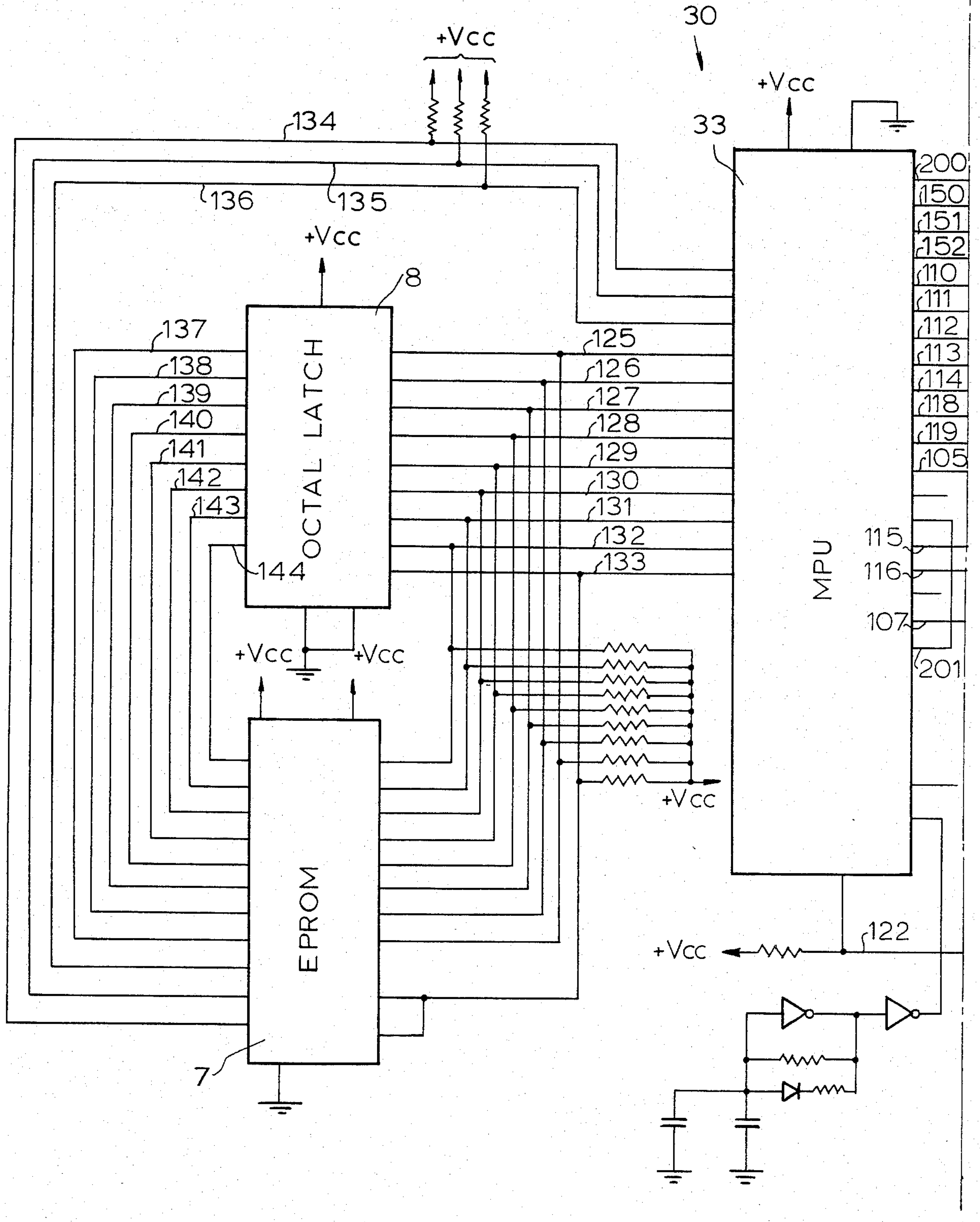
FIGS. 8A and 8B comprise a schematic diagram of the receiver.
Figure 8B:
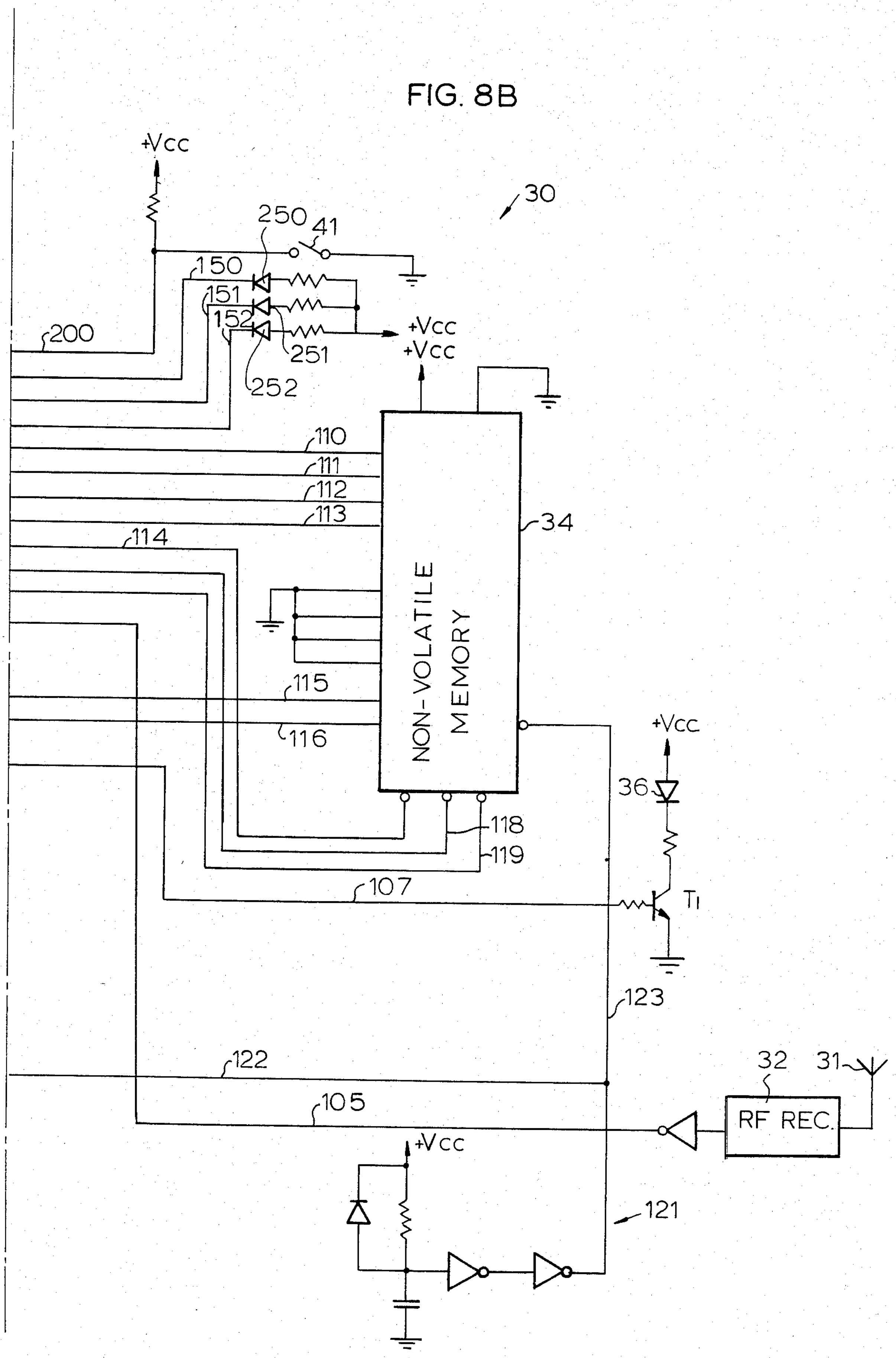

FIG. 8 illustrates the receiver in schematic form. The micro-computer 33 may be a type 404LP available from National Corporation. The antenna 31 is connected to the RF receiver 32 and by lead 105 to the micro-computer 33. The programming LED 36 is connected through a resistor and a transistor T1 to lead 107 which is connected to the micro-computer 33. A non-volatile memory 34 which might be a type X2210 available from XICOR is connected by leads 110 through 119 to the micro-computer 33. A reset circuit 121 is connected by leads 122 and 123 to the reset of the micro-computer 33 and the memory 34. An octal latch 8 which might be type 74C373 is connected by leads 125 through 133 to the micro-computer 33. An EPROM 7 which may be a type 2715 is connected to the octal latch 8 and to the computer 33 by leads 125 through 136. The EPROM 7 and octal latch 8 are connected together by leads 137 through 144. The program switch 41 is connected to the micro-computer 33 by lead 200. The channel indicator lights 250, 251 and 252 are connected to the micro-computer by leads 150, 151 and 152 and illustrate which channel is energized.

Although the invention has been described with respect to preferred embodiments, it is not to be so limited as changes and modifications can be made which are within the full intended scope of the invention as defined by the appended claims.

APPENDIX

TRANSMITTER SOFTWARE LISTING

```
001F         CKSUM = 1,15         ;CHECKSUM
001E         BLK4 = 1,14          ;INFORMATION BLOCK 4
001D         BLK3 = 1,13          ;INFORMATION BLOCK 3
001C         BLK2 = 1,12          ;INFORMATION BLOCK 2
001B         BLK1 = 1,11          ;INFORMATION BLOCK 1
001A         IDNUM = 1,10         ;I. D NUMBER
002E         COUNT0 = 2,14        ;GP COUNTER 0
002D         COUNT1 = 2,13        ;GP COUNTER 1
002C         COUNT2 = 2,12        ;GP COUNTER 2
003F         SCRATC = 3,15        ;SCRATCH PAD REGISTER
003E         BRPNT = 3,14         ;BR MEMORY POINTER
003D         BDPNT = 3,13         ;BD MEMORY POINTER
003C         COMP1 = 3,12         ;COMPARE REGISTER 1
003B         COMP2 = 3,11         ;COMPARE REGISTER 2
003A         CNTROL = 3,10        ;CONTROL WORD REGISTER
0030         NOUSE = 3,0          ;SCRATCH PAD REGISTER
000F         FLAG1 = 0,15         ;FLAG REGISTER 1
          ;INITIALIZATION
000 00       CLRA
001 3E       LBI SCRATC
002 7F       STII 15
003 40       COMP
004 3E       LBI SCRATC
005 333A     OMG                  ;INITIALIZE G PORT
007 333C     CAMQ                 ;INITIALIZE L PORT
009 3361     LEI 1                ;TRISTATE L PORT
00B 50       CAB                  ;SET SI AS BINARY COUNTER
00C 333E     OBD                  ;SET SO = 0
                                  ;INITIALIZE D PORT
```

```
                ;CHECK FOR VALID PROGRAMMING SIGNAL ON INPUT G0
                ;FOR A PERIOD OF APPROX. 10 MSEC.
00E 2E    START:  LBI IRIN
00F 70            STII 0
010 2E            LBI IRIN
011 3301          SKGBZ 0             ;IS INPUT A LOGIC 1 ?
013 D5            JP BR1              ;YES
014 E5            JP BEGIN            ;NO, ACTIVE INPUT ,CHECK
015 00    BR1:    CLRA                ;FOR SYNC PULSE
017 3301  BR3:    SKGBZ 0             ;IS INPUT STILL A LOGIC 1 ?
019 DB            JP BR2              ;YES
01A E5            JP BEGIN            ;NO, ACTIVE INPUT, CHECK
01B 51    BR2:    AISC 1              ;FOR SYNC PULSE
01C D7            JP BR3
01D 06            X 0
01E 51            AISC 1
01F 06            X 0
020 05            LD 0
021 5A            AISC 10
022 D5            JP BR1
023 60D0          JMP STRTX           ;NO INDICATION OF A PROGRAMMING
                                      ;SIGNAL WITHIN 10 MSEC.
025 3C    BEGIN:  LBI BDPNT           ;INITIALIZE RECEIVED DATA
026 7B            STII 11             ;MEMORY POINTER
027 2D            LBI COUNTO          ;RESET COUNTER IRIN
028 70            STII 0
029 70            STII 0
02A 19            LBI IDNUM
02C 70            STII 0
02D 70            STII 0
02E 70            STII 0
02F 70            STII 0
030 70            STII 0
031 2D            LBI COUNTO
032 3301          SKGBZ 0             ;IS INPUT A LOGIC 1 ?
```

```
034 F6              JP LOOK1          ;YES
035 E5              JP BEGIN          ;NO
036 00      LOOK1:  CLRA
037 51              AISC 1
038 3301    BR5:    SKGBZ 0           ;IS INPUT STILL A LOGIC 1 ?
03A FC              JP BR4            ;YES
03B E5              JP BEGIN          ;NO
03C 51      BR4     AISC 1
03D F8              JP BR5
03E 06              X 0
03F 51              AISC 1
040 06              X 0
041 05              LD 0
042 5D              AISC 13
043 6036            JMP LOOK1
045 2E              LBI IRIN          ;VALID 5 MSEC. BLANK TIME
046 00              CLRA
047 3301            SKGBZ 0           ;IS INPUT A LOGIC 0 ?
049 C7              JP .-2            ;NO
04A 51      BR6:    AISC 1            ;YES
04B 3301            SKGBZ 0           ;IS INPUT STILL A LOGIC 0 ?
04D CF              JP BR7            ;NO, RISING TRANSITION DETECTED
04E CA              JP BR6            ;YES
04F 06      BR7:    X 0               ;STORE COUNT IN IRIN
051 5E              AISC 14           ;FOR SAMPLE VALUE
052 44              NOP
053 2C              LBI COUNT1        ;STORE SAMPLE VALUE
054 06              X 0               ;IN COUNTER 1
055 2E              LBI IRIN          ;CHECK FOR OVERFLOW
056 00              CLRA
057 21              SKE
058 DB              JP REPEAT         ;NO OVERFLOW
059 600E            JMP START         ;OVERFLOW EXISTS
05B 3301    REPEAT  SKGBZ 0           ;CHECK FOR FALLING TRANSITION
```

```
05D DB            JP . -2           ;INPUT STILL HIGH
05E 6974          JSR SAMPLE        ;FALLING TRANSITION DETECTED
060 3C            LBI BDPNT         ;POINT TO RECEIVE DATA POINTER
061 25            LD 2
062 50            CAB
063 20            SKC
064 6067          JMP BR8
066 4B            SMB 3
067 3301   BR8:   SKGBZ 0           ;LOOK FOR FALLING TRANSITION
06A E7            JP BR8            ;INPUT STILL LOW
06B 3301   BR9:   SKGBZ 0
06D EB            JP . -2           ;INPUT STILL HIGH
06E 6974          JSR SAMPLE        ;FALLING TRANSITION DETECTED
070 3C            LBI BDPNT         ;POINT TO RECEIVE DATA POINTER
071 25            LD 2
072 50            CAB
073 20            SKC
074 F6            JP BR10
075 46            SMB 2
076 3301   BR10:  SKGBZ 0           ;LOOK FOR FALLING TRANSITION
078 FA            JP BR11           ;INPUT STILL HIGH
079 F6            JP BR10           ;INPUT STILL LOW
07A 3301   BR11:  SKGBZ 0
07C FA            JP -2             ;INPUT STILL HIGH
07D 6974          JSR SAMPLE        ;FALLING TRANSITION DETECTED
07F 3C            LBI BDPNT         ;POINT TO RECEIVE DATA POINTER
080 25            LD 2
081 50            CAB
082 20            SKC
083 85            JP BR12
084 47            SMB 1
085 3301   BR12:  SKGBZ 0           ;LOOK FOR FALLING TRANSITION
087 89            JP BR13           ;INPUT STILL HIGH
088 85            JP BR12           ;INPUT STILL LOW
089 3301   BR13:  SKGBZ 0
```

```
08B 89          JP .-2          ;INPUT STILL HIGH
08C 6974        JSR SAMPLE      ;FALLING TRANSITION DETECTED
08E 3C          LBI BDPNT       ;POINT TO RECEIVE DATA POINTER
08F 25          LD 2
090 50          CAB
092 94          JP BR14
093 4D          SMB 0
094 3C    BR14. LBI BDPNT       ;INCREMENT BD POINTER
095 05          LD 0
096 51          AISC 1          ;LAST MEMORY LOCATION FILLED ?
097 99          JP BR15         ;NO
098 9F          JP BR16         ;YES
099 06    BR15  X 0
09A 3301  BR17: SKGBZ 0         ;LOOK FOR FALLING TRANSITION
09C 605B        JMP REPEAT      ;INPUT STILL HIGH
09E 9A          JP BR17         ;INPUT STILL LOW
          ;CALCULATE RECEIVED DATA CHECKSUM
09F 00    BR16: CLRA
0A0 1A          LBI BLK1
0A1 31          ADD
0A2 1B          LBI BLK2
0A3 31          ADD
0A4 1C          LBI BLK3
0A5 31          ADD
0A7 31          ADD
0A8 1E          LBI CKSUM
0A9 21          SKE             ;CHECKSUM CORRECT
0AA 600E        JMP START       ;CHECKSUM INCORRECT
          ;PROGRAM NON-VOLATILE MEMORY
0AC 0E          LBI FLAG1       ;SET WRITE TO NVRAM FLAG
0AD 4C          RMB 0
0AE 39          LBI CNTROL      ;STORE CONTROL WORD
0AF 73          STII 3
0B0 6983        JSR NVRAM       ;STORE DATA IN NVRAM
0B2 3F          LBI NOUSE       ;INITIATE A STORE COMMAND
```

```
0B3 7D            STII 13           ;TO NVRAM
0B4 3F            LBI NOUSE
0B5 333A          OMG
0B7 3F            LBI NOUSE
0B8 7F            STII 15           ;TERMINATE STORE TO NVRAM
0B9 3F            LBI NOUSE
0BA 333A          OMG
0BC 3A     BR18:  LBI COMP2         ;INITIALIZE COMPARE
0BD 7F            STII 15           ;REGISTERS
0BE 7F            STII 15
0BF 2C            LBI COUNT1        ;RESET COUNTER REGISTERS
0C0 70            STII 0
0C1 70            STII 0
0C2 0A            LBI 0,11          ;TURN ON READY INDICATOR
0C3 333E          OBD
0C5 69B2          JSR TIMER
0C7 2C            LBI COUNT1        ;RESET COUNTER REGISTERS
0C8 70            STII 0
0C9 70            STII 0
0CA 0E            LBI 0,15          ;TURN OFF INDICATOR
0CD 69B2          JSR TIMER
0CF BC            JP BR18
           ;START TRANSMIT SEQUENCE
0D0 3387   STRTX: LBI 0,7           ;INSTITUTE AN ARRAY RECALL
0D2 333E          OBD               ;CYCLE TO NVRAM
0D4 0E            LBI 0,15
0D5 333E          OBD
0D7 0E            LBI FLAG1         ;SET READ FROM NVRAM FLAG
0D8 4D            SMB 0
0D9 39            LBI CNTROL        ;STORE CONTROL WORD
0DA 77            STII 7
0DB 6983          JSR NVRAM
0DD 19            LBI IDNUM         ;READ CHANNEL ID NUMBER
0DE 332E          INL
           ;CALCULATE CHECKSUM OF DATA BLOCKS AND ID NUMBER
```

```
0E0 00            CLRA
0E1 19            LBI IDNUM
0E2 31            ADD
0E3 1A            LBI BLK1
0E5 1B            LBI BLK2
0E6 31            ADD
0E7 1C            LBI BLK3
0E8 31            ADD
0E9 1D            LBI BLK4
0EA 31            ADD
0EB 1E            LBI CKSUM        ;STORE CHECKSUM IN CKSUM
0EC 06            X 0
          ;TRANSMIT SYNC PULSE
0ED 3B    INITX   LBI COMP1        ;INITILIZE COMPARE REGISTER
0EE 78            STII 8
0EF 00            CLRA
0F0 3B            LBI COMP1
0F1 3369          LEI 9            ;SET ENG=1, SO=1
0F3 51    BR19:   AISC 1           ;TRANSMIT LOGIC 1
0F4 21            SKE              ;FOR 500 USEC.
0F5 F3            JP BR19
0F6 3361          LEI 1            ;SET ENG=0, SO=0
0F8 3B            LBI COMP1        ;TRANSMIT LOGIC 0
0F9 7D            STII 13          ;FOR 1.5 MSEC.
0FA 00            CLRA
0FB 3B            LBI COMP1
0FC 51    BR20:   AISC 1
0FD 44            NOP
0FE 21            SKE
0FF 60FC          JMP BR20
101 44            NOP
102 44            NOP
          ;TRANSMIT DATA BLOCK
```

```
246 103 3C            LBI BDPNT          ;INITIALIZE BD POINTER TO
248 105 3A            LBI COMP2          ;DATA TO BE TRANSMITTED
249 106 70            STII 0
250 107 3C    NXBYTE: LBI BDPNT
251 108 25            LD 2
252 109 50            CAB
253 10A 3361          LEI 1              ;SET EN3=0,S0=0
254 10C 13            SKMBZ 3            ;CHECK LOGIC STATUS OF BIT 3
255 10D D0            JP BR21            ;RAM B3=1
256 10E 32            RC                 ;RAM B3=0
257 10F D1            JP BR22
258 110 22    BR21:   SC
259 111 69CB  BR22:   JSR TXMIT
260 113 3E            LBI SCRATC         ;160 USEC. DELAY
261 114 7E            STII 14
262 115 3E            LBI SCRATC
263 116 06            X 0
264 117 51            AISC 1
265 118 D7            JP .-1
267 11A 3C            LBI BDPNT
268 11B 25            LD 2
269 11C 50            CAB
270 11D 3361          LEI 1              ;SET EN3=0,S0=0
271 11F 03            SKMBZ 2            ;CHECK LOGIC STATUS OF BIT 2
272 120 E3            JP BR23            ;RAM B2=1
273 121 32            RC                 ;RAM B2=0
274 122 E4            JP BR24
275 123 22    BR23:   SC
276 124 69CB  BR24:   JSR TXMIT
277 126 3E            LBI SCRATC         ;160 USEC. DELAY
278 127 7E            STII 14
279 128 3E            LBI SCRATC
280 129 06            X 0
281 12A 51            AISC 1
282 12B EA            JP .-1
```

```
283 12C 44              NOP
284 12D 3C              LBI BDPNT
285 12E 25              LD 2
286 12F 50              CAB
287 130 3361            LEI 1          ;SET EN3=0,SO=0
288 132 11              SKMBZ 1        ;CHECK LOGIC STATUS OF BIT 1
289 133 F6              JP BR25        ;RAM B1=1
290 134 32              RC             ;RAM B1=0
291 135 F7              JP BR26
292 136 22      BR25:   SC
293 137 69CB    BR26:   JSR TXMIT
294 139 3E              LBI SCRATC
295 13A 7E              STII 14
296 13B 3E              LBI SCRATC
297 13C 06              X 0            ;160 USEC  DELAY
298 13D 51              AISC 1
301 140 3C              LBI BDPNT
302 141 25              LD 2
303 142 50              CAB
304 143 3361            LEI 1          ;SET EN3=0,SO=0
305 145 01              SKMBZ 0        ;CHECK LOGIC STATUS OF BIT 0
306 146 C9              JP BR27        ;RAM B0=1
307 147 32              RC             ;RAM B0=0
308 148 CA              JP BR28
309 149 22      BR27:   SC
310 14A 69CB    BR28:   JSR TXMIT
311 14C 3C              LBI BDPNT      ;INCREMENT BD POINTER
312 14D 05              LD 0
313 14E 51              AISC 1
314 14F 44              NOP
315 150 06              X 0
316 151 05              LD 0
317 152 3A              LBI COMP2      ;LAST MEMORY LOCATION
319 154 6107            JMP NXBYTE     ;NO
320 156 44              NOP            ;YES
```

```
157 3361          LEI 1
159 3B            LBI COMP1
15A 78            STII 8
15B 00            CLRA
15C 3B            LBI COMP1
15D 44            NOP
15E 44            NOP
          ;TRANSMIT TERMINATOR
15F 3B            LBI COMP1
160 78            STII 8
161 00            CLRA
162 3B            LBI COMP1
163 3369          LEI 9            ;SET EN3=1, SO=1
165 51   BR29     AISC 1           ;TRANSMIT LOGIC 1 FOR 500 USEC
166 21            SKE
167 E5            JP BR29
168 3361          LEI 1            ;SET EN3=0,SO=0
          ;TRANSMIT BLANK TIME OF 28 MSEC
16A 3A            LBI COMP2        ;INITIALIZE COMPARE REGISTERS
16B 72            STII 2
16C 76            STII 6
16D 2C            LBI COUNT1       ;RESET COUNTER REGISTERS
16E 70            STII 0
16F 70            STII 0
170 69B2          JSR TIMER
172 60ED          JMP INITX        ;RETRANSMIT DATA
          ;SUBROUTINES
          ;        SUBROUTINE SAMPLE
174 2C   SAMPLE:  LBI COUNT1
175 00            CLRA             ;SETUP SAMPLING VALUE
177 44            NOP
178 21            SKE
179 F6            JP SUB1
17A 3301          SKGBZ 0          ;READ INPUT
17C 6181          JMP SUB2
```

```
17E 22            SC              ;INPUT IS A LOGIC 0
17F 6182          JMP SUB3
181 32    SUB2:   RC              ;INPUT IS A LOGIC 1
182 48    SUB3:   RET
          ;              SUBROUTINE NVRAM
183 3B    NVRAM:  LBI COMP1       ;INITIALIZE BD MEMORY POINTER
184 7F            STII 15         ;AND COMPARE REGISTER
185 7B            STII 11
186 3C    SUB6:   LBI BDPNT
187 25            LD 2            ;OUTPUT ADDRESS POINTED TO
188 51            AISC 1          ;BY COMPARE REGISTER
18A 333E          OBD
18C 39            LBI CNTROL      ;OUTPUT CONTROL WORD TO
18D 333A          OMG             ;MEMORY
18F 0E            LBI FLAG1       ;CHECK FOR READ OR WRITE
190 01            SKMBZ 0         ;FLAG
191 DB            JP SUB4         ;READ FLAG
192 3C            LBI BDPNT       ;WRITE FLAG
193 25            LD 2
194 50            CAB
195 00            CLRA
196 333C          CAMQ            ;WRITE TO NVRAM
198 3365          LEI 5           ;ENABLE L DRIVERS
19A E1            JP SUB5
19B 3C    SUB4:   LBI BDPNT
19C 25            LD 2
19D 50            CAB
19E 332E          INL             ;READ FROM NVRAM
1A0 06            X 0
1A1 3F    SUB5:   LBI NOUSE       ;INITIATE A DESELECT
1A2 7F            STII 15
1A3 3F            LBI NOUSE
1A4 333A          OMG
```

```
1A6 3361          LEI 1          ;DISABLE L DRIVERS
1A8 3C            LBI BDPNT
1A9 05            LD 0
1AA 51            AISC 1
1AB 06            X 0            ;STORE NEW VALUE FOR
1AC 05            LD 0           ;MEMORY POINTER
1AD 3B            LBI COMP1      ;LAST MEMORY LOCATION
1AE 21            SKE            ;ACCESSED?
1AF 6186          JMP SUB6       ;NO
1B1 48            RET            ;YES
1B2 2D    TIMER:  LBI COUNT0
1B3 00            CLRA
1B4 51            AISC 1
1B5 F4            JP  -1         ;640 USEC. DELAY LOOP
1B6 05            LD 0           ;COUNT0 CONTENTS TO ACCU
1B7 51            AISC 1         ;ADD 1 TO ACCU
1B8 FD            JP LP1
1B9 07            XDS            ;STORE ZERO IN COUNT0
1BA 05            LD 0           ;DECREMENT TO COUNT1
1BB 51            AISC 1         ;ADD 1 TO COUNT1
1BC 44            NOP
1BD 06    LP1:    X 0
1BE 3A            LBI COMP2      ;COMPARE COUNTERS TO
1BF 05            LD 0           ;COMPARE REGISTERS

1C0 2C            LBI COUNT1
1C1 21            SKE            ;SKIP IF MOST SIGN. COUNT
1C2 61B2          JMP TIMER      ;EQUALS COMP2
1C4 3B            LBI COMP1
1C5 05            LD 0
1C7 21            SKE            ;EQUALS COUNT0
1C8 61B2          JMP TIMER      ;NO, INSTITUTE ANOTHER CYCLE
1CA 48            RET
                  ;              TRANSMIT SUBROUTINE
1CB 3B    TXMIT:  LBI COMP1
```

```
427 1CC 73          STII 3
428 1CD 00          CLRA
429 1CE 3B          LBI COMP1
430 1CF 44          NOP
431 1D0 3369        LEI 9              ;SET EN3=1,S0=1
432 1D2 51    INC1  AISC 1             ;250 USEC. LOOP
433 1D3 21          SKE
434 1D4 D2          JP INC1
435 1D5 20          SKC                ;TRANSMIT A LOGIC 1, S0=1
436 1D6 DF          JP TRANS0          ;TRANSMIT A LOGIC 0, S0=0
437 1D7 3B          LBI COMP1
438 1D8 74          STII 4
439 1D9 3B          LBI COMP1
440 1DA 00          CLRA
441 1DB 51    INC2: AISC 1             ;240 USEC. LOOP
442 1DC 21          SKE
443 1DD DB          JP INC2
444 1DE 48          RET
445 1DF 3361  TRANS0: LEI 1            ;SET EN3=0
446 1E1 3B          LBI COMP1
447 1E2 73          STII 3
448 1E3 3B          LBI COMP1
449 1E4 00          CLRA
450 1E5 51    INC3  AISC 1             ;180 USEC. LOOP
451 1E6 21          SKE
452 1E7 E5          JP INC3
453 1E8 48          RET
454                 END

BDPNT  003D   BEGIN  0025   BLK1  001B   BLK2  001C
BLK3   001D   BLK4   001E   BR1   0015   BR10  0076
BR11   007A   BR12   0085   BR13  0089   BR14  0094
BR15   0099   BR16   009F   BR17  009A   BR18  00BC
BR19   00F3   BR2    001B   BR20  00FC   BR21  0110
BR22   0111   BR23   0123   BR24  0124   BR25  0136
BR26   0137   BR27   0149   BR28  014A   BR29  0165
```

```
BR7     004F    BR8     0067    BR9     006B    BRPNT   003E *
CKSUM   001F    CNTROL  003A    COMP1   003C    COMP2   003D
COUNT0  002E    COUNT1  002D    COUNT2  002C *  FLAG1   000F
IDNUM   001A    INC1    01D2    INC2    01DB    INC3    01E5
INITX   00ED    IRIN    002F    LOOK1   0036    LP1     01BD
NOUSE   0030    NVRAM   0183    NXBYTE  0107    REPEAT  005B
SAMPLE  0174    SCRATC  003F    START   000E    STRTX   00D0
SUB1    0176    SUB2    0181    SUB3    0182    SUB4    019B
SUB5    01A1    SUB6    0186    TIMER   01B2    TRANS0  01DF
TXMIT   01CB

NO ERROR LINES

 489  ROM WORDS USED

COP   420  ASSEMBLY

SOURCE CHECKSUM = 50C2

OBJECT CHECKSUM = 0CB2

INPUT FILE    GENUSER.JANN.SRC  VN:    1

OBJECT FILE   GENUSER.JANN.LM
```

```
                ;           RECEIVER SOFTWARE LISTING
                ;
                ;
                ;           "COPYRIGHT 1982
                ;            CHAMBERLAIN MANUFACTURING CORPORATION
                ;            ALL RIGHTS RESERVED"
                ;
                ;
                ;
        001F          CKSUM = 1,15          ;CHECKSUM
        001E          BLK4 = 1,14           ;INFORMATION BLOCK 4
        001D          BLK3 = 1,13           ;INFORMATION BLOCK 3
        001C          BLK2 = 1,12           ;INFORMATION BLOCK 2
        001B          BLK1 = 1,11           ;INFORMATION BLOCK 1
        001A          IDNUM = 1,10          ;I. D. NUMBER
```

```
       002F        IRIN = 2,15          ;INFRARED INPUT COUNTER
       002E        COUNT0 = 2,14        ;GP COUNTER 0
       002D        COUNT1 = 2,13        ;GP COUNTER 1
       002C        COUNT2 = 2,12        ;GP COUNTER 2
       003F        SCRATC = 3,15        ;SCRATCH PAD REGISTER
       003E        BRPNT = 3,14         ;BR MEMORY POINTER
       003D        BDPNT = 3,13         ;BD MEMORY POINTER
       003C        COMP1 = 3,12         ;COMPARE REGISTER 1
       003B        COMP2 = 3,11         ;COMPARE REGISTER 2
       003A        CNTROL = 3,10        ;CONTROL WORD REGISTER
       0030        NOUSE = 3,0          ;SCRATCH PAD REGISTER
       000F        RCKSUM = 0,15
       000E        RBLK4 = 0,14
       000D        RBLK3 = 0,13
       000C        RBLK2 = 0,12
       000B        RBLK1 = 0,11
       000A        RIDNUM = 0,10
       0009        FLAG1 = 0,9
          ;INITIALIZATION
000 00             CLRA
001 3E             LBI SCRATC
002 7F             STII 15
003 40             COMP
004 3E             LBI SCRATC
005 333A           OMG                  ;INITIALIZE G PORT
007 333C           CAMQ                 ;INITIALIZE L PORT
009 3360           LEI 0                ;TRISTATE L PORT
00B 50             CAB                  ;SET SI AS SHIFT REGISTER
00C 333E           OBD                  ;SET SO = 0
                                        ;INITIALIZE D PORT
00E 08             LBI FLAG1
00F 4D             SMB 0                ;SET READ FROM NVRAM FLAG
010 39             LBI CNTROL           ;STORE CONTROL WORD
011 77             STII 7
012 3387           LBI 0,7              ;INSTITUTE AN ARRAY RECALL
```

```
014 333E           OBD                  ;CYCLE
016 0E             LBI 0,15
017 333E           OBD
019 69D7           JSR NVRAM
01B 3F    START:   LBI NOUSE            ;CHECK FOR PROGRAM SWITCH
01C 332E           INL                  ;CLOSURE
01E 13             SKMBZ 3
01F 60F1           JMP BEGIN            ;NO, MONITOR RECEIVE INPUT
021 08    NGEN:    LBI FLAG1            ;YES, PROGRAM SWITCH CLOSED
022 47             SMB 1                ;SET PROGRAM FLAG
023 3F             LBI NOUSE            ;CHECK FOR ALL ZERO INPUTS
024 00             CLRA
025 06             X 0
026 1A             LBI BLK1
027 21             SKE                  ;BLK1=0
028 F8             JP BR1
029 1B             LBI BLK2
02A 21             SKE                  ;BLK2=0
02B F8             JP BR1
02C 1C             LBI BLK3
02D 21             SKE                  ;BLK3=0
02E F8             JP BR1
02F 1D             LBI BLK4
030 21             SKE                  ;BLK4=0
031 F8             JP BR1
032 0A             LBI 0,11             ;ALL BLOCKS EQUAL 0
033 7F             STII 15              ;STORE DEFAULT NUMBER
034 7E             STII 14
035 7D             STII 13
036 7C             STII 12
037 FA             JP BR2
038 6A3D  BR1:     JSR RANDOM           ;GENERATE NEW RANDOM NUMBER
03A 0A    BR2:     LBI 0,11             ;TRANSFER GENERATED NUMBER
03B 15             LD 1                 ;TO BLOCKS 1 THRU 4
03C 06             X 0
```

```
03D 0B       LBI 0,12
03E 15       LD 1
03F 06       X 0

040 0C       LBI 0,13
041 15       LD 1
042 06       X 0
043 0D       LBI 0,14
044 15       LD 1
045 06       X 0
046 08       LBI FLAG1        ;PROGRAM NEW CODE
047 4C       RMB 0            ;TO NVRAM
048 39       LBI CNTROL
049 73       STII 3
04A 69D7     JSR NVRAM
04C 3F       LBI NOUSE        ;INSTITUTE A STORE COMMAND
04D 7D       STII 13
04E 3F       LBI NOUSE
04F 333A     OMG
051 3F       LBI NOUSE
052 7F       STII 15          ;TERMINATE STORE COMMAND
053 3F       LBI NOUSE
054 333A     OMG
          ;CALCULATE DATA BLOCK CHECKSUM
056 00       CLRA
057 1A       LBI BLK1
058 31       ADD
059 1B       LBI BLK2
05A 31       ADD
05B 1C       LBI BLK3
05C 31       ADD
05D 1D       LBI BLK4
05E 31       ADD
05F 1E       LBI CKSUM
060 06       X 0
```

```
                    ;TRANSMIT SYNC PULSE
061 3B      INITX:  LBI COMP1       ;INITILIZE COMPARE REGISTER
062 78              STII 8
063 00              CLRA
064 3B              LBI COMP1
065 3369            LEI 9           ;SET EN3=1, SO=1
067 51      BR19:   AISC 1          ;TRANSMIT LOGIC 1
068 21              SKE             ;FOR 500 USEC
069 E7              JP BR19
06A 3361            LEI 1           ;SET EN3=0, SO=0
06C 3B              LBI COMP1       ;TRANSMIT LOGIC 0
06D 7D              STII 13         ;FOR 1.5 MSEC
06E 00              CLRA
06F 3B              LBI COMP1
070 51      BR20:   AISC 1
071 44              NOP
072 21              SKE
073 6070            JMP BR20
075 44              NOP
076 44              NOP
                    ;TRANSMIT DATA BLOCK
077 3C              LBI BDPNT       ;INITIALIZE BD POINTER TO
078 7B              STII 11         ;FIRST AND LAST LOCATION OF
079 3A              LBI COMP2       ;DATA TO BE TRANSMITTED
07A 70              STII 0
07B 3C      NXBYTE: LBI BDPNT
07C 25              LD 2
07D 50              CAB
07E 3361            LEI 1           ;SET EN3=0, SO=0

080 13              SKMBZ 3         ;CHECK LOGIC STATUS OF BIT 3
081 84              JP BR21         ;RAM B3=1
082 32              RC              ;RAM B3=0
083 85              JP BR22
084 22      BR21:   SC
```

```
085 6A1F   BR22:   JSR TXMIT
087 3E             LBI SCRATC          ;160 USEC. DELAY
088 7E             STII 14
089 3E             LBI SCRATC
08A 06             X 0
08B 51             AISC 1
08C 8B             JP -1
08D 44             NOP
08E 3C             LBI BDPNT
08F 25             LD 2
090 50             CAB
091 3361           LEI 1               ;SET EN3=0, S0=0
093 03             SKMBZ 2             ;CHECK LOGIC STATUS OF BIT 2
094 97             JP BR23             ;RAM B2=1
095 32             RC                  ;RAM B2=0
096 98             JP BR24
097 22     BR23:   SC
098 6A1F   BR24:   JSR TXMIT
09A 3E             LBI SCRATC          ;160 USEC. DELAY
09B 7E             STII 14
09C 3E             LBI SCRATC
09D 06             X 0
09E 51             AISC 1
09F 9E             JP -1
0A0 44             NOP
0A1 3C             LBI BDPNT
0A2 25             LD 2
0A3 50             CAB
0A4 3361           LEI 1               ;SET EN3=0, S0=0
0A6 11             SKMBZ 1             ;CHECK LOGIC STATUS OF BIT 1
0A7 AA             JP BR25             ;RAM B1=1
0A8 32             RC                  ;RAM B1=0
0A9 AB             JP BR26
0AA 22     BR25:   SC
0AB 6A1F   BR26:   JSR TXMIT
```

```
0AD 3E              LBI SCRATC
0AE 7E              STII 14
0AF 3E              LBI SCRATC
0B0 06              X 0             ;160 USEC. DELAY
0B1 51              AISC 1
0B2 B1              JP .-1
0B3 44              NOP
0B4 3C              LBI BDPNT
0B5 25              LD 2
0B6 50              CAB
0B7 3361            LEI 1           ;SET EN3=0,SO=0
0B9 01              SKMBZ 0         ;CHECK LOGIC STATUS OF BIT 0
0BA BD              JP BR27         ;RAM B0=1
0BB 32              RC              ;RAM B0=0
0BC BE              JP BR28
0BD 22      BR27:   SC
0BE 6A1F    BR28:   JSR TXMIT

0C0 3C              LBI BDPNT       ;INCREMENT BD POINTER
0C1 05              LD 0
0C2 51              AISC 1
0C3 44              NOP
0C4 06              X 0
0C5 05              LD 0
0C6 3A              LBI COMP2       ;LAST MEMORY LOCATION
0C7 21              SKE             ;TRANSMITTED
0C8 607B            JMP NXBYTE      ;NO
0CA 44              NOP             ;YES
0CB 3361            LEI 1
0CD 3B              LBI COMP1
0CE 78              STII 8
0CF 00              CLRA
0D0 3B              LBI COMP1
0D1 44              NOP
0D2 44              NOP
```

```
                  ;TRANSMIT TERMINATOR
0D3 3B                      LBI COMP1
0D4 78                      STII 8
0D5 00                      CLRA
0D6 3B                      LBI COMP1
0D7 3369                    LEI 9               ;SET EN3=1, SO=1
0D9 51          BR29:       AISC 1              ;TRANSMIT LOGIC 1 FOR 500 USE(
0DA 21                      SKE
0DB D9                      JP BR29
0DC 3361                    LEI 1               ;SET EN3=0,SO=0
                  ;TRANSMIT BLANK TIME OF  5 MSEC
0DE 3A                      LBI COMP2           ;INITIALIZE COMPARE REGISTERS
0DF 70                      STII 0
0E0 78                      STII 8
0E1 2C                      LBI COUNT1          ; RESET COUNTER REGISTERS
0E2 70                      STII 0
0E3 70                      STII 0
0E4 6A06                    JSR TIMER
0E6 3F                      LBI NOUSE           ;CHECK FOR PROGRAM
0E7 332E                    INL                 ;SWITCH CLOSURE
0E9 13                      SKMBZ 3
0EA F1                      JP BEGIN            ;SWITCH NOT CLOSED
0EB 08                      LBI FLAG1           ;SWITCH CLOSED
0EC 11                      SKMBZ 1             ;IS PROGRAM FLAG SET?
0ED 6061                    JMP INITX           ;YES RETRANSMIT DATA
0EF 6021                    JMP NGEN            ;NO GENERATE NEW RANDOM NUMBE
0F1 08          BEGIN:      LBI FLAG1
0F2 45                      RMB 1
0F3 3362                    LEI 2
0F5 3C                      LBI BDPNT           ;INITIALIZE RECEIVED DATA
0F6 7A                      STII 10             ;MEMORY POINTER
0F7 2D                      LBI COUNTO          ;RESET COUNTER IRIN
0F8 70                      STII 0
0F9 70                      STII 0
0FA 09                      LBI RIDNUM
```

```
0FB 70               STII 0
0FC 70               STII 0
0FD 6104             JMP JT4
0FF 44               NOP
100 3360             LEI 0
102 601B             JMP START
104 70       JT4:    STII 0
105 70               STII 0
106 70               STII 0
107 70               STII 0
108 2D               LBI COUNTO
109 3301             SKGBZ 0          ;IS INPUT A LOGIC 1 ?
10B CE               JP LOOK1         ;YES
10C 60F1             JMP BEGIN        ;NO
10E 00       LOOK1:  CLRA
10F 51               AISC 1
110 3301     BR5:    SKGBZ 0          ;IS INPUT STILL A LOGIC 1 ?
112 D5               JP BR4           ;YES
113 60F1             JMP BEGIN        ;NO
115 51       BR4:    AISC 1
116 D0               JP BR5
117 06               X 0
118 51               AISC 1
119 06               X 0
11A 05               LD 0
11B 5A               AISC 10
11C 610E             JMP LOOK1
11E 2E               LBI IRIN         ;VALID 10 MSEC. BLANK TIME
11F 00               CLRA
120 3301             SKGBZ 0          ;IS INPUT A LOGIC 0 ?
123 51       BR 6    AISC 1
124 3301             SKGBZ 0          ;IS INPUT STILL A LOGIC 0 ?
126 E8               JP BR7           ;NO, RISING TRANSITION DETECTI
127 E3               JP BR6           ;YES
128 06       BR7:    X 0              ;STORE COUNT IN IRIN
```

```
294 129 05                LD 0              ;SUBTRACT CORRECTION FACTOR
295 12A 5E                AISC 14           ;FOR SAMPLE VALUE
296 12B 44                NOP
297 12C 2C                LBI COUNT1        ;STORE SAMPLE VALUE
298 12D 06                X 0               ;IN COUNTER 1
299 12E 2E                LBI IRIN          ;CHECK FOR OVERFLOW
300 12F 00                CLRA
301 130 21                SKE
302 131 F4                JP REPEAT         ;NO OVERFLOW
303 132 601B              JMP START         ;OVERFLOW EXISTS
304 134 3301    REPEAT:   SKGBZ 0           ;CHECK FOR FALLING TRANSITION
305 136 F4                JP .-2            ;INPUT STILL HIGH
306 137 69C8              JSR SAMPLE        ;FALLING TRANSITION DETECTED
307 139 3C                LBI BDPNT         ;POINT TO RECEIVE DATA POINTEI
308 13A 35                LD 3
309 13B 50                CAB
310 13C 20                SKC
311 13D 6140              JMP BR8
312 13F 4B                SMB 3
313 140 3301    BR8:      SKGBZ 0           ;LOOK FOR FALLING TRANSITION
314 142 C4                JP BR9            ;INPUT STILL HIGH
315 143 C0                JP BR8            ;INPUT STILL LOW
316 144 3301    BR9:      SKGBZ 0
317 146 C4                JP .-2            ;INPUT STILL HIGH
318 147 69C8              JSR SAMPLE        ;FALLING TRANSITION DETECTED
319 149 3C                LBI BDPNT         ;POINT TO RECEIVE DATA POINTE
320 14A 35                LD 3
321 14B 50                CAB
322 14C 20                SKC
323 14D CF                JP BR10
324 14E 46                SMB 2
325 14F 3301    BR10:     SKGBZ 0           ;LOOK FOR FALLING TRANSITION
326 151 D3                JP BR11           ;INPUT STILL HIGH
327 152 CF                JP BR10           ;INPUT STILL LOW
328 153 3301    BR11:     SKGBZ 0
```

```
155 D3                JP .-2            ;INPUT STILL HIGH
156 69C8              JSR SAMPLE        ;FALLING TRANSITION DETECTED
158 3C                LBI BDPNT         ;POINT TO RECEIVE DATA POINTE
159 35                LD 3
15A 50                CAB
15B 20                SKC
15C DE                JP BR12
15D 47                SMB 1
15E 3301      BR12:   SKGBZ 0           ;LOOK FOR FALLING TRANSITION
160 E2                JP BR13           ;INPUT STILL HIGH
161 DE                JP BR12           ;INPUT STILL LOW
162 3301      BR13:   SKGBZ 0
164 E2                JP .-2            ; INPUT STILL HIGH
165 69C8              JSR SAMPLE        ;FALLING TRANSITION DETECTED
167 3C                LBI BDPNT         ;POINT TO RECEIVE DATA POINT
168 35                LD 3
169 50                CAB
16A 20                SKC
16B ED                JP BR14
16C 4D                SMB 0
16D 3C        BR14:   LBI BDPNT         ;INCREMENT BD POINTER
16E 05                LD 0
16F 51                AISC 1            ;LAST MEMORY LOCATION FILLED
170 F2                JP BR15           ;NO
171 F8                JP BR16           ;YES
172 06        BR15:   X 0
173 3301      BR17:   SKGBZ 0           ;LOOK FOR FALLING TRANSITION
175 6134              JMP REPEAT        ;INPUT STILL HIGH
177 F3                JP BR17           ;INPUT STILL LOW
              ;CALCULATE RECEIVED DATA CHECKSUM
178 00        BR16:   CLRA
179 09                LBI RIDNUM
17A 31                ADD
17B 0A                LBI RBLK1
17C 31                ADD
```

```
17D 0B     LBI RBLK2
17E 31     ADD
17F 0C     LBI RBLK3
180 31     ADD
181 0D     LBI RBLK4
182 31     ADD
183 0E     LBI RCKSUM
184 21     SKE              ;CHECKSUM CORRECT
185 601B   JMP START        ;CHECKSUM INCORRECT
187 08     LBI FLAG1
188 4D     SMB 0            ;SET READ FROM NVRAM FLAG
189 39     LBI CNTROL       ;STORE CONTROL WORD
18A 77     STII 7
18B 3387   LBI 0,7          ;INSTITUTE AN ARRAY RECALL
18D 333E   OBD              ;CYCLE
18F 0E     LBI 0,15
190 333E   OBD
192 69D7   JSR NVRAM
194 1A     LBI BLK1         ;CHECK FOR RANDOM
195 15     LD 1             ;NUMBER MATCH
196 21     SKE
197 601B   JMP START
199 1B     LBI BLK2
19A 15     LD 1
19B 21     SKE
19C 601B   JMP START
19E 1C     LBI BLK3
19F 15     LD 1
1A0 21     SKE
1A1 601B   JMP START
1A3 1D     LBI BLK4
1A4 15     LD 1
1A5 21     SKE
1A6 601B   JMP START
1A8 09     LBI RIDNUM
```

```
1A9 4B                SMB 3
1AA 05                LD 0
1AB 40                COMP
1AC 333C              CAMQ
1AE 3364              LEI 4
1B0 3A                LBI COMP2          ;INITILIZE COMPARE REGISTERS
1B1 7F                STII 15
1B2 7F                STII 15
1B3 2E                LBI IRIN
1B4 70                STII 0
1B5 2C      JT1:      LBI COUNT1         ;INITIALIZE COUNTER REGISTERS
1B6 70                STII 0
1B7 70                STII 0
1B8 6A06              JSR TIMER
1BA 2E                LBI IRIN
1BB 06                X 0
1BC 51                AISC 1
1BD 61C1              JMP JT2
1BF 61C4              JMP JT3

1C1 06      JT2:      X 0
1C2 61B5              JMP JT1
1C4 3360    JT3:      LEI 0
1C6 601B              JMP START
            ;SUBROUTINES
            ;              SUBROUTINE SAMPLE
1C8 2C      SAMPLE:   LBI COUNT1
1C9 00                CLRA               ;SETUP SAMPLING VALUE
1CA 51      SUB1:     AISC 1
1CB 44                NOP
1CC 21                SKE
1CD CA                JP SUB1
1CE 3301              SKGBZ 0            ;READ INPUT
1D0 61D5              JMP SUB2
1D2 22                SC                 ;INPUT IS A LOGIC 0
```

```
1D3 61D6            JMP SUB3
1D5 32      SUB2:   RC                  ;INPUT IS A LOGIC 1
1D6 48      SUB3:   RET
            ;               SUBROUTINE NVRAM
1D7 3B      NVRAM:  LBI COMP1           ;INITIALIZE BD MEMORY POINTER
1D8 7F              STII 15             ;AND COMPARE REGISTER
1D9 7B              STII 11
1DA 3C      SUB6:   LBI BDPNT
1DB 25              LD 2                ;OUTPUT ADDRESS POINTED TO
1DC 51              AISC 1              ;BY COMPARE REGISTER
1DD 50              CAB
1DE 333E            OBD
1E0 39              LBI CNTROL          ;OUTPUT CONTROL WORD TO
1E1 333A            OMG                 ;MEMORY
1E3 08              LBI FLAG1           ;CHECK FOR READ OR WRITE
1E4 01              SKMBZ 0               ;FLAG
1E5 EF              JP SUB4             ;READ FLAG
1E6 3C              LBI BDPNT           ;WRITE FLAG
1E7 25              LD 2
1E8 50              CAB
1E9 00              CLRA
1EA 333C            CAMQ                ;WRITE TO NVRAM
1EC 3344            LEI 4               ;ENABLE L DRIVERS
1EE F5              JP SUB5
1EF 3C      SUB4:   LBI BDPNT
1F0 25              LD 2
1F1 50              CAB
1F2 332E            INL                 ;READ FROM NVRAM
1F4 06              X 0
1F5 3F      SUB5:   LBI NOUSE           ;INITIATE A DESELECT
1F6 7F              STII 15
1F7 3F              LBI NOUSE
1F8 333A            OMG
1FA 3360            LEI 0               ;DISABLE L DRIVERS
1FC 3C              LBI BDPNT
```

```
1FD 05            LD 0
1FE 51            AISC 1
1FF 06            X 0              ;STORE NEW VALUE FOR
200 05            LD 0             ;MEMORY POINTER
201 3B            LBI COMP1        ;LAST MEMORY LOCATION
202 21            SKE              ;ACCESSED?
203 61DA          JMP SUB6         ;NO
205 48            RET              ;YES
            ;               SUBROUTINE TIMER
206 2D    TIMER:  LBI COUNTO
207 00            CLRA
208 51            AISC 1
209 C8            JP -1            ;640 USEC. DELAY LOOP
20A 05            LD 0             ;COUNTO CONTENTS TO ACCU.
20B 51            AISC 1           ;ADD 1 TO ACCU
20C D1            JP LP1
20D 07            XDS              ;STORE ZERO IN COUNTO
20E 05            LD 0             ;DECREMENT TO COUNT1
20F 51            AISC 1           ;ADD 1 TO COUNT1
210 44            NOP
211 06    LP1:    X 0
212 3A            LBI COMP2        ;COMPARE COUNTERS TO
213 05            LD 0             ;COMPARE REGISTERS
214 2C            LBI COUNT1
215 21            SKE              ;SKIP IF MOST SIGN. COUNT
216 6206          JMP TIMER        ;EQUALS COMP2
218 3B            LBI COMP1
219 05            LD 0
21A 2D            LBI COUNTO       ; SKIP IF LEAST SIGN. COUNT
21B 21            SKE              ;EQUALS COUNTO
21C 6206          JMP TIMER        ;NO, INSTITUTE ANOTHER CYCLE
21E 48            RET
            ;               TRANSMIT SUBROUTINE
21F 3B    TXMTT:  LBI COMP1
```

```
220 73              STII 3
221 00              CLRA
222 3B              LBI COMP1
223 44              NOP
224 3369            LEI 9                 ;SET EN3=1,SO=1
226 51      INC1:   AISC 1                ;250 USEC. LOOP
227 21              SKE
228 E6              JP INC1
229 20              SKC                   ;TRANSMIT A LOGIC 1, SO=1
22A F3              JP TRANSO             ;TRANSMIT A LOGIC 0, SO=0
22B 3B              LBI COMP1
22C 74              STII 4
22D 3B              LBI COMP1
22E 00              CLRA
22F 51      INC2:   AISC 1                ;240 USEC. LOOP
230 21              SKE
231 EF              JP INC2
232 48              RET
233 3361    TRANSO: LEI 1                 ;SET EN3=0
235 3B              LBI COMP1
236 73              STII 3
237 3B              LBI COMP1
238 00              CLRA
239 51      INC3:   AISC 1                ;180 USEC. LOOP
23A 21              SKE
23B F9              JP INC3
23C 48              RET
            ;RANDOM NUMBER GENERATOR
            ;SEED CONTAINED IN (1,11) THRU (1,14) IS USED AS A BASIS
            ;FOR A NEW RANDOM NUMBER GENERATED IN AND STORED IN
            ;(0,11) THRU (0,14)
23D 3C      RANDOM: LBI RDPNT
23E 7E              STII 14
23F 1A              LBI BLK1              ;XOR BITS 1 AND 2 OF BLK1
240 05              LD 0                  ;USING INTERNAL SHIFT REGISTER
```

```
241 4F              XAS
242 4F              XAS
243 02              XOR
244 3F              LBI NOUSE
245 06              X 0
246 03              SKMBZ 2
247 625E            JMP SUB10
249 6259            JMP SUB11
24B 3C     SUB12:   LBI BDPNT    ;SHIFT LEFT BLOCKS 1 THRU
24C 25              LD 2         ;4 USING XOR OF BLOCK
24D 50              CAB          ;1 BITS 1 AND 2 AS
24E 15              LD 1         ;ENTRY FOR THE LEAST
24F 4F              XAS          ;SIGNIFICANT BIT OF BLK4
250 4F              XAS
251 17              XDS 1
252 4E              CBA
253 3C              LBI BDPNT
254 26              X 2
255 50              CAB
256 13              SKMBZ 3
257 625E            JMP SUB10
259 1A     SUB11:   LBI 1,11     ;XOR OPERATION = 0
25A 333E            OBD          ;FORCE LEAST SIGN BIT ON
25C 6261            JMP SUB13    ;SHIFT REGISTER TO 0
25E 1E     SUB10:   LBI 1,15     ;XOR OPERATION = 1
25F 333E            OBD          ;FORCE LEAST SIGN BIT ON
261 3C     SUB13:   LBI BDPNT    ;SHIFT REGISTER TO 1
262 05              LD 0
263 55              AISC 5
264 E7              JP SUB14
265 624B            JMP SUB12    ;CONTINUE UNTIL FINISHED
267 48     SUB14:   RET          ;TERMINATE PROCESS
           ;
           ;
           ;
```

```
        ;          "COPYRIGHT 1982
        ;           CHAMBERLAIN MANUFACTURING CORPORATION.
        ;           ALL RIGHTS RESERVED"
        ;
        ;
                  END
```

I claim as my invention:

1. Apparatus for controlling a receiver with a remote radio frequency transmitter comprising a first micro-processor and a first memory means in said receiver for storing at least one address code, non-radio frequency transmitting means in said receiver, switch means for energizing said non-radio frequency transmitting means to transmit an address code, a non-radio frequency receiving means in said transmitter for receiving said address code, a second micro-processor and second memory means in said transmitter for storing said address code, radio frequency radiating means in said transmitter for radiating said address code, receiving means in said receiver for receiving said radio frequency radiated address code, said first micro-processor in said receiver comparing the received address code with the address code stored in said first memory, an output circuit energized by said comparing means when said addresses are the same, wherein said first memory means comprises a non-volatile memory and a programmable read only memory and said second memory means comprises a non-volatile memory and a programmable read only memory.

2. Apparatus according to claim 1 wherein said first micro-processor is programmed to operate as a pseudo random number generator to generate a plurality of different address codes to allow the address codes in said transmitter and receiver to be changed.

3. Apparatus according to claim 2 wherein said non-radio frequency transmitting means is a light radiator.

4. Apparatus according to claim 3 wherein said non-radio frequency receiving means in said transmitter is a light detector.

5. Apparatus according to claim 2 wherein said non-radio frequency transmitting means in said receiver is an electrical conductor.

6. Apparatus according to claim 4 wherein said address code comprises a serial binary code of pulse length modulated form of a plurality of word lengths.

7. Apparatus according to claim 6 wherein said address code contains a binary check block for indicating whether a correct signal has been received.

8. Apparatus according to claim 6 wherein said address code contains a binary synchronizing block for synchronizing the transmitter and receiver.

9. Apparatus according to claim 6 wherein said address code contains a terminating block.

10. Apparatus according to claim 6 wherein said address code is repeated and each address code is separated by a blanking period.

11. Apparatus according to claim 2 including a first octal latch in said receiver which is connected to said first micro-processor.

12. Apparatus according to claim 2 including a second octal latch in said transmitter.

* * * * *